United States Patent
Clemens et al.

[15] 3,652,823
[45] Mar. 28, 1972

[54] INTERCHANGEABLE PLURAL ELECTRODE GUIDES FOR ELECTRIC ARC WELDING

[72] Inventors: Kurt Clemens, Dieringhausen; Hans Klein, Bunghausen, both of Germany

[73] Assignee: L. & C. Steinmuller GmbH, Gummersbach Rhld, Germany

[22] Filed: Oct. 6, 1969

[21] Appl. No.: 864,032

[30] Foreign Application Priority Data

Oct. 29, 1968 Germany .................. P 18 05 737.9

[52] U.S. Cl. ........................... 219/130, 219/136
[51] Int. Cl. .................................... B23k 9/00
[58] Field of Search ............ 226/109, 110; 219/74, 60.1, 219/130, 137

[56] References Cited

UNITED STATES PATENTS

| | | | |
|---|---|---|---|
| 2,827,550 | 3/1958 | Unrath | 219/130 |
| 2,903,567 | 8/1959 | Piekarski et al. | 219/130 |
| 3,129,370 | 4/1964 | Meter | 219/130 |
| 3,445,622 | 5/1969 | Hubbard | 219/130 |
| 3,445,623 | 5/1969 | Fukushima | 219/130 |
| 3,475,585 | 10/1969 | Pierce | 219/131 |
| 2,151,914 | 3/1939 | Hopkins | 219/130 |
| 2,681,970 | 6/1954 | Koopman | 219/130 X |
| 2,723,331 | 11/1955 | Tyrner | 219/130 |
| 2,862,101 | 11/1958 | Klinke | 219/130 X |
| 3,062,950 | 11/1962 | Chyle | 219/127 |
| 3,119,536 | 1/1964 | Berkeley | 226/110 |
| 3,483,354 | 12/1969 | Manz et al. | 219/137 |

Primary Examiner—J. V. Truhe
Assistant Examiner—George A. Montanye
Attorney—McGlew and Toren

[57] ABSTRACT

A device for the continuous mechanical welding of hollow bodies such as tubes includes a mounting means for one or more welding nozzles, and a plurality of welding wire feed nozzles which may be interchangeably engaged in the mounting means in a position such that they may feed the welding wire directly to the workpiece at a desired angular orientation. Each tubular feed nozzle is associated with a supply of welding wire from a reel supply and means are provided for feeding the welding wire to the associated nozzle. The wire feed nozzles can be used selectively as cold wire or as current nozzles depending on the welding method which is employed.

8 Claims, 2 Drawing Figures

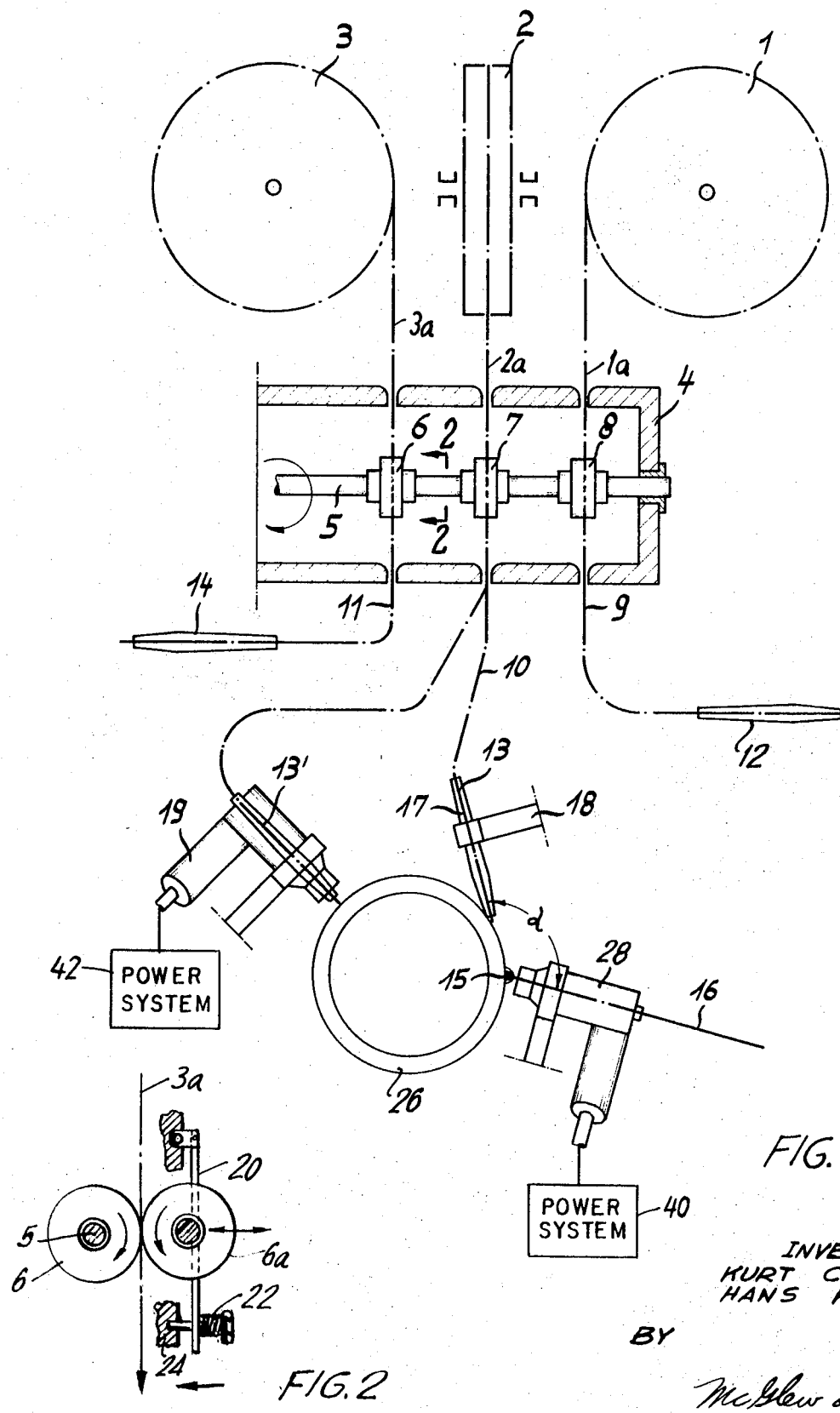

INTERCHANGEABLE PLURAL ELECTRODE GUIDES FOR ELECTRIC ARC WELDING

SUMMARY OF THE INVENTION

This invention relates in general to welding apparatus and particularly to a new and useful apparatus for the continuous mechanical welding of hollow bodies with a slight welding seam super-elevation at different wall thicknesses at different cross-sectional forms and different materials.

When assembling hollow bodies such as pipes which are welded together from individual pipe sections of different length to pipes or lines it is necessary, when changing the material or the wall thickness, to use different welding wires and if necessary also a different welding method. This greatly impairs the continuity of the operation insofar as it becomes necessary to introduce the welding wire, which is required for a new material, both into the wire feed system and into the welding apparatus itself. Since this was done heretofore exclusively by hand considerable time was expended.

In accordance with the present invention, there is provided an apparatus with which the entire welding operation can be effected continuously even beyond the similar material boundary with the selective application of different known welding methods. This is achieved by feeding a plurality of welding wires corresponding to the different materials of the hollow bodies to be welded through separate wire guide tubes and wire guide nozzles. The individual wire guide nozzles may be selectively employed as cold wire or current nozzles depending on the type of welding method which is to be employed and may be easily positioned in an operative location at the welding station. (the welding method may be the so-called TIG method, the MIG method or the MAG method).

The advantage of the apparatus, according to the invention, is that when the material boundary is reached it is merely necessary to replace the cold wire or current nozzle just being used by a cold wire or current nozzle of another welding wire of different composition, depending on the welding method which is employed. In addition to the exchange of the nozzle when reaching a material boundary at which the material to be operated on will change, the cold wire or current nozzle can also be exchanged to provide a wall thickness boundary change. It is possible, for example, to change from a TIG welding method to a MIG or to a MAG welding method.

In order to ensure continuous feed of the respective required welding wire it is suggested in accordance with the invention to arrange on a common drive shaft for the welding wire feed a plurality of separate feed rollers, one for each of the wires which will be employed. The feed for the selected wire is effected by shifting a counterroller into engagement over the selected wire and its associated feed roller to cause the feeding out of the selected wire. When this is done the other wires lie loosely on the rotating feed rollers without pressure so that they are not fed off.

If the TIG method of welding is employed, where a so-called cold wire is introduced into a melting bath produced by a machine burner, it was found particularly for the production of welded seams with a low seam super elevation, that the angles enclosed by the machine burner axis and the cold wire nozzle axis must have a certain magnitude. In a further development of the invention it was therefore suggested when using the TIG welding method that the angle formed by the machine burner axis and the cold wire nozzle axis be from 30° to 180°.

Accordingly it is an object of the invention to provide a device, particularly for welding hollow bodies such as pipes of varied thickness and materials, which includes means for mounting at least one nozzle in a welding position at a welding station, and a plurality of welding wire nozzle tubes each separately connected to a selected welding wire of a specific type selectively engageable in the mounting means.

A further object of the invention is to provide means for feeding a plurality of welding wires including a feed roller over which the wire is fed and a counterroller selectively movable into engagement with each of the feed rollers for each wire, wire nozzle members for each wire through which the wire is fed, and means for urging the counter rollers into engagement with a selected one of said feed rollers for feeding the selected wire to the associated nozzle member.

A further object of the invention is to provide a welding apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a schematic partly elevational and partly sectional view of a welding machine constructed in accordance with the invention; and FIG. 2 is a section taken along the line II—II of FIG. 1.

GENERAL DESCRIPTION OF THE PREFERRED EMBODIMENT

Referring to the drawing in particular, the invention embodied therein comprises a welding apparatus which includes a plurality of supply reels for welding wire, in this instance three reels 1, 2 and 3 which are rotatably mounted. Each reel carries a distinctive type of welding wire 1a, 2a and 3a respectively. The wires are fed through openings in a wire feed mechanism 4 which includes a rotatable drive shaft 5 which is rotated by drive means (not shown). The shaft 5 carries a roller 6, 7 and 8 for each of the respective wires 3a, 2a and 1a. The wires are engaged over the respective feed roller, and counterrollers 6a (7a and 8a not shown) are mounted on lever elements 20 which may be shifted backwardly and forwardly to engage or disengage from the respective feed roller 6. In the embodiment illustrated a spring 22 is indicated as urging the lever 20 into engagement with the feed roller 6 at which time the welding wire 3a would be fed therebetween. A movable control member 24 secured to the same shaft as the lever 20 is provided for disengaging the associated counterroller 6a so that the feed of the associated wire 3a will be discontinued.

In accordance with the invention the welding wires 1a, 2a and 3a are connected through feeding tubes 9, 10 and 11 which are schematically indicated but which for example may be made of flexible material to permit their bending as desired. The tubes connect at their outer ends into associated nozzles 12, 13 and 14 which for example may be cold wire nozzles.

The welding apparatus includes mounting means such as a mounting bracket 18 for orienting a selected nozzle 12, 13 or 14 in a position to operate on a workpiece 26 such as a pipe.

In the embodiment illustrated one of the welding wires, for example the wire 2a, is fed into the cold wire nozzle 13 mounted in the clamping means 18 to move it into a welding site 15 which is heated by apparatus 28. The feed of the welding wire to the machine burner axis 16 is arranged so that the feeding takes place at a prescribed angle α which is advantageously maintained between 30° and 180°. The angle is measured from the burner machine axis 16 to the axis 17 of the nozzle 13. A suitable power system 40 energizes the apparatus 28.

The TIG method can be carried out with the apparatus according to the invention in such a way for example that a first welding wire of a composition, for example, 15 Mo 3, is taken from the reel 3 and brought to the guide nozzle 14 and then mounted at the clamping means 18 at the welding station 15. When the material boundary is reached which requires a higher alloyed welding wire the cold wire nozzle 14 is removed from the clamp 18 and replaced by a nozzle such as the nozzle 13 for example which feeds a wire 2a which is of the desired material. When still another material boundary is reached which requires an even higher alloyed welding wire the nozzle 13 is replaced by the nozzle 12 for example. In this instance the counterroller for the feed roller 8 would be engaged to feed the wire 1a.

The necessary exchange of the various wire nozzles with the different welding wires corresponding to the different material boundaries can be practiced not only the TIG method but also with the same nozzles in the MIG and MAG methods. It is also possible to combine a TIG and a MIG-MAG method in which case the cold wire nozzle 13 used in the TIG method is introduced into the machine burner while changing to the MIG-MAG method where it acts as a current nozzle associated with the apparatus 19. A suitable power system 42 energizes the apparatus 19.

The apparatus constructed in accordance with the invention permits the continuous welding of hollow bodies, particularly pipes of different material compositions and wall thicknesses. In an advantageous manner it permits use of various welding methods for carrying out the welding process.

What is claimed is:

1. An apparatus for welding using welding wires of different composition, comprising feed means adapted to selectively feed a plurality of different welding wires of different materials, a plurality of guide means each coupled to said feed means and adapted to support a wire, said guide means each including an exit portion adapted to feed a wire and directed beyond the end of said guide means, welding means in the vicinity of a location at which a wire is to be applied, said welding means being adapted to receive electric current and to hold said guide means one at a time and to direct the exit portion of the held one of said guide means toward a location to which a wire is to be applied while the others of said guide means are kept from the location, said welding means when holding said guide means being adapted to produce a welding arc and a molten pool at the location, said guide means when kept from the location being electrically and operably detached from said welding means; the exit portion of said guide means, when said guide means are held in said welding means, being adapted solely to direct a rod directly into a molten pool formed by said welding means.

2. An apparatus as in claim 1, wherein the exit portion includes rigid tube means.

3. An apparatus as in claim 2, wherein said guide means includes lead means extending from said feed means to said rigid tube means.

4. An apparatus as in claim 1, wherein said welding means includes holding means for holding said guide means one at a time and to direct the exit portion of said guide means, said guide means further including an electrical operating portion, said guide means when kept from the location being electrically and operably detached from said holding means and said operating portion and any source of power.

5. An apparatus as in claim 1, wherein said feed means includes a common rotatable drive shaft, a plurality of feed rollers each mounted on said drive shaft and engageable with a wire, and counterroller means engageable selectively with each of said feed rollers adapted to selectively feed a welding wire through the held one of said guide means.

6. An apparatus as in claim 1, wherein said welding means includes holding means for holding and directing a wire, and heat forming means mounted adjacent said holding means for forming a welding-wire-consuming heated zone adjacent the exit portion, said heat forming means including an electrode and positioning means for positioning the axis of the electrode relative to the direction of a wire as it emerges from the exit portion over a range from 30° to 180°.

7. A welding device comprising a plurality of welding wire wheels rotatably mounted to permit welding wires to be fed therefrom, feed roller means adapted to pass wires emerging from the wire reels, counterroller means selectively engageable with said feed roller means and adapted to effect the feeding of an associated welding wire, and a plurality of nozzle tubes each selectively associated with a welding wire and having a bore through which the welding wire is adapted to feed, said nozzle tubes each including an exit portion adapted to direct the wire beyond the end of the nozzle tube, welding means in the vicinity of the location at which a wire is to be applied, said welding means being adapted to receive electric current and to hold said nozzle tubes one at a time while the others of said nozzle tubes remain out of said welding means, said welding means when holding said nozzle tubes being adapted to produce a welding arc and a molten pool, said nozzle tubes when kept out of said welding means being electrically and operably detached from said welding means; the exit portions of said nozzle tubes, when said nozzle tubes are held in said welding means, solely directing a wire directly into a molten pool formed by said welding means.

8. An apparatus for continuous welding comprising a plurality of rotatably mounted reels, welding wires wound on said reels, said welding wires on each reel having a different composition than the welding wires of other reels, feed means for selectively feeding said wires, a plurality of guide means each coupled to said feed means for carrying one of said wires, said guide means each including an exit portion for feeding the wire and directing it toward a desired location, welding means in the vicinity of the location, said welding means being adapted to receive electric current and to hold said guide means one at a time and to direct the exit portion of the held one of said guide means toward the location while the others of said guide means are kept from the location, said welding means when holding said guide means being adapted to produce a welding arc and a molten pool, said guide means when kept from the location being electrically and operably detached from said welding means; the exit portions of said guide means, when said guide means are held in said welding means, solely directing the wire held by said guide means directly into a molten pool formed by said welding means.

* * * * *